US010788348B2

United States Patent
Rensing et al.

(10) Patent No.: US 10,788,348 B2
(45) Date of Patent: Sep. 29, 2020

(54) METHOD OF DETERMINING THE LEFT EIGENVECTORS IN A FLOWING CORIOLIS FLOWMETER

(71) Applicant: Micro Motion, Inc., Boulder, CO (US)

(72) Inventors: Matthew Joseph Rensing, Cincinnati, OH (US); Christopher George Larsen, Cincinnatti, OH (US); Timothy J. Cunningham, Boulder, CO (US); Stuart J. Shelley, Cincinnati, OH (US)

(73) Assignee: Micro Motion, Inc., Boulder, CO (US)

( * ) Notice: Subject to any disclaimer, the term of this patent is extended or adjusted under 35 U.S.C. 154(b) by 341 days.

(21) Appl. No.: 15/745,040

(22) PCT Filed: Jul. 27, 2015

(86) PCT No.: PCT/US2015/042265
§ 371 (c)(1),
(2) Date: Jan. 15, 2018

(87) PCT Pub. No.: WO2017/019016
PCT Pub. Date: Feb. 2, 2017

(65) Prior Publication Data
US 2018/0266864 A1 Sep. 20, 2018

(51) Int. Cl.
*G01F 1/84* (2006.01)
*G01F 25/00* (2006.01)

(52) U.S. Cl.
CPC ........ *G01F 1/8436* (2013.01); *G01F 25/0007* (2013.01)

(58) Field of Classification Search
CPC .................. G01F 1/8436; G01F 25/0007
(Continued)

(56) References Cited

U.S. PATENT DOCUMENTS 7,706,987 B2 * 4/2010 Sharp .................... G01F 1/8436
702/48

FOREIGN PATENT DOCUMENTS

DE 2007028209 A1 * 12/2008 ............. G01F 1/849
DE 102007028209 A1 12/2008
(Continued)

*Primary Examiner* — Tarun Sinha
(74) *Attorney, Agent, or Firm* — The Ollila Law Group LLC

(57) ABSTRACT

A method and apparatus for a flowmeter (5) is provided. The method comprises the steps of placing a material in a flow tube (130, 130') while exciting a vibration mode of the flow tube (130, 130'). Exciting the vibration mode of the flow tube (130, 130') comprises the steps of periodically driving a first driver (180L) with a first signal and periodically driving a second driver (180R) with a second signal, wherein the second driver (180R) is driven essentially in phase with the first driver (180L), but wherein the first driver's (180L) drive amplitude modulated signal reaches a maximum amplitude when the second driver's (180R) drive modulated signal reaches a minimal amplitude, and the first driver's (180L) drive amplitude modulated signal reaches a minimum amplitude when the second driver's (180R) drive amplitude modulated signal reaches a maximum amplitude. The method also comprises the steps of measuring the relative phase between a first pickoff (170L) and a second pickoff (170R) and determining a relative phase of a right eigenvector for the flow tube (130, 130').

23 Claims, 12 Drawing Sheets

(58) Field of Classification Search
USPC .......................................................... 73/1.34
See application file for complete search history.

(56) References Cited

FOREIGN PATENT DOCUMENTS

| | | |
|---|---|---|
| EP | 1264161 B1 | 8/2009 |
| WO | 2008152060 A1 | 12/2008 |

\* cited by examiner

METHOD OF DETERMINING THE LEFT EIGENVECTORS IN A FLOWING CORIOLIS FLOWMETER

FIELD OF THE INVENTION

The invention is related to the field of flowmeters, and in particular, to Coriolis flowmeters.

BACKGROUND OF THE INVENTION

Mass flow rate is measured in a Coriolis flowmeter by vibrating a fluid-carrying tube(s) in a sinusoidal motion and measuring the time delay (or phase angle) between the vibration responses at two or more locations on the tube(s). For practical situations the time delay varies linearly with mass flow rate; however, the time delay is generally not zero at zero mass flow. There is usually a zero-flow delay or offset caused by a number of factors such as non-proportional damping, residual flexibility response, electromagnetic crosstalk, or phase delay in instrument electronics, for example.

This zero-flow offset is typically corrected for by measuring the zero-flow offset during a zero-flow condition and subtracting the measured offset from subsequent measurements made during flow. This would be sufficient to correct for the zero-flow offset problem if the zero-flow offset remained constant. Unfortunately, the zero-flow offset can be affected by small changes in the ambient environment (such as temperature) or to changes in the piping system through which the material is flowing. The changes in the zero-flow offset will cause errors in the measured flow rates. During normal operations there may be long periods of time between no-flow conditions, and the flowmeter can only be calibrated by zeroing the meter only during these no-flow conditions. The changes in the zero-offset over time may therefore cause significant errors in the measured flow.

The operation of Coriolis flowmeters can be described using mathematical formulas, as more fully described in U.S. Pat. Nos. 7,441,469 and 7,706,987 which are both assigned on their face to Micro Motion, Inc. and are hereby incorporated by reference. The general system of first order differential equations describing the motion of a linear system is:

$$\begin{bmatrix} C & M \\ M & 0 \end{bmatrix} \begin{Bmatrix} \dot{x} \\ \vdots \\ \dot{x} \end{Bmatrix} + \begin{bmatrix} K & 0 \\ 0 & -M \end{bmatrix} \begin{Bmatrix} x \\ \vdots \\ x \end{Bmatrix} = \begin{Bmatrix} f \\ 0 \end{Bmatrix} \quad (1)$$

In Equation (1) M and K are the mass and stiffness matrices of the system and C is a general damping matrix which may have a symmetric component due to damping and a skew symmetric component due to Coriolis force.

$$Aq + Bq = u \quad (2)$$

Equation 1 can be rewritten as Equation 2 where A is equal to the matrix $$\begin{bmatrix} C & M \\ M & 0 \end{bmatrix},$$

B is equal to the matrix $$\begin{bmatrix} K & 0 \\ 0 & -M \end{bmatrix}$$

and u is equal to $$\begin{Bmatrix} f \\ 0 \end{Bmatrix}.$$

Insight into the equation of motion can be gained by looking at Equations 1 and 2. The generalized eigenvalue problem associated with Equation (2) may be solved for the right eigenvectors, $\phi^{(r)}$, such that:

$$B\phi^{(r)} = -A\phi^{(r)}\lambda \quad (3)$$

For symmetric A and B matrices, the eigenvector can be used to diagonalize, or decouple the equations of motion. Decoupled equations are readily solved. For a non-symmetric system for example, where C includes the Coriolis matrix, the right eigenvectors do not diagonalize the equations of motion, resulting in coupled equations. Coupled equations are more difficult to solve and hinder insight into the solution. Left eigenvectors are required to diagonalize non-symmetric A or B matrixes. The following derivations show the process. The left eigenvectors are obtained by solving the following generalized eigenvalue problem:

$$\phi^{(l)T}B = -\phi^{(l)T}A\lambda$$

$$B^T\phi^{(l)} = -A^T\phi^{(l)}\lambda \quad (4)$$

M and K would generally be symmetric for a Coriolis flowmeter. For no flow, C would also be symmetric, thus, the system matrices, A and B would be symmetric. In this case, Equations (3) and (4) are identical and the left and right eigenvectors are the same. When there is flow, the associated non-symmetry of the C matrix causes the left and right eigenvectors to be different.

Consider the j'th right eigenvector:

$$B\phi_j^{(r)} = -A\phi_j^{(r)}\lambda_j \quad (5)$$

and the i'th left eigenvector;

$$\phi_i^{(l)T}B = -\phi_i^{(l)T}A\lambda_i \quad (6)$$

Pre-multiplying Equation (5) by $\phi_i^{(l)T}$, and post multiplying Equation (6) by $\phi_i^{(r)T}$ and subtracting the two yields:

$$0 = -\phi_i^{(l)T}A\phi_j^{(r)}(\lambda_j - \lambda_i) \Rightarrow \phi_i^{(l)T}A\phi_j^{(r)} = 0 \text{ for } i \neq j \quad (7)$$

By multiplying Equation (5) by $$\frac{1}{\lambda_j}$$

and Equation (6) by $$\frac{1}{\lambda_i}$$

and going through the same procedure it can be shown:

$$\Rightarrow \phi_i^{(l)T}B\phi_j^{(r)} = 0 \text{ for } i \neq j \quad (8)$$

Equations (7) and (8) show that by pre and post multiplying either of the system matrices, A or B, by the matrix of left eigenvectors, $\Phi^{(L)}$, and the matrix of right eigenvectors, $\Phi^{(R)}$, respectively, the system matrices are diagonalized.

$$\Phi^{(L)T} A \Phi^{(R)} = \begin{bmatrix} \ddots & & \\ & M_A & \\ & & \ddots \end{bmatrix} \quad (9)$$

$$\Phi^{(L)T} B \Phi^{(R)} = \begin{bmatrix} \ddots & & \\ & M_B & \\ & & \ddots \end{bmatrix}$$

The fact that the left and right eigenvector matrices diagonalize the system matrices means that both the set of right eigenvectors and the set of left eigenvectors are linearly independent. Either set can be used as a basis of a coordinate system for the response. Recognizing that the difference between the left and right eigenvectors is due to the skew-symmetric Coriolis matrix forms one basis of this invention.

In terms of a mathematical model of the flowmeter, the mass, stiffness and damping matrices which model non-Coriolis effects are symmetric. For a no-flow system, the left and right eigenvectors are identical (within an arbitrary scale factor). The Coriolis force associated with flow, however, manifests itself in the mathematical model as a skew symmetric damping matrix (the transpose is the negative of the original matrix). The skew symmetric Coriolis matrix causes the left and right eigenvectors of the system to be different. For a flowing system with no non-proportional damping, the relative phase between different coefficients of the left eigenvectors is equal and opposite to the relative phase between the same coefficients on the right eigenvectors. For a system with non-proportional damping, these phase values are offset equally for both the left and right eigenvectors, however, the difference remains the same.

Thus, if the phase characteristics of the left and right eigenvectors can be measured accurately, this characteristic allows the phase attributable to zero-offset from non-proportional damping and the phase attributable to material flow to be distinguished, eliminating associated zero-offset errors. Overall, there is a need for a system and method for accurately calibrating the zero-flow offset during flow.

SUMMARY OF THE INVENTION

A method is provided comprising placing a material in a flow tube while exciting a vibration mode of the flow tube. Exciting the vibration mode of the flow tube comprises the steps of: periodically driving a first driver with a first signal and periodically driving a second driver with a second signal, wherein the second driver is driven essentially in phase with the first driver, and wherein the first driver's drive amplitude modulated signal reaches a maximum amplitude when the second driver's drive amplitude modulated signal reaches a minimal amplitude, and the first driver's drive amplitude modulated signal reaches a minimum amplitude when the second driver's drive amplitude modulated signal reaches a maximum amplitude. Additionally, exciting the vibration mode of the flow tube comprises the steps of measuring the relative phase between a first pickoff and a second pickoff and determining a relative phase of a right eigenvector for the flow tube.

A method is provided comprising flowing a material through a flow tube while periodically exciting a vibration mode of the flow tube such that a first driver's drive amplitude modulated signal reaches a maximum amplitude when a second driver's drive amplitude modulated signal reaches a minimal amplitude, and the first driver's drive amplitude modulated signal reaches a minimum amplitude when the second driver's drive amplitude modulated signal reaches a maximum amplitude. The method also comprises the steps of measuring the relative motion of the vibrating flow tube, measuring a relative phase of a right eigenvector while exciting the vibration mode of the flow tube, and determining the material flow through the flow tube using the relative phase of a right eigenvector corrected by a zero offset. A new zero offset is also determined without stopping the material flow through the flow tube using a relative phase of a left eigenvector for the flow tube. Also, the material flow through the flow tube is determined using the relative phase of a right eigenvector corrected by the new zero offset.

A vibratory flowmeter is provided, comprising a flowmeter assembly that includes one or more flow tubes and first and second pickoff sensors, as well as first and second drivers configured to vibrate the one or more flow tubes. Meter electronics are coupled to the first and second pickoff sensors and coupled to the first and second drivers, with the meter electronics being configured to provide a first signal to the first driver and a second signal to the second driver, wherein the second driver is driven essentially in phase with the first driver, wherein the first driver's drive amplitude modulated signal reaches a maximum amplitude when the second driver's drive amplitude modulated signal reaches a minimal amplitude, and the first driver's drive amplitude modulated signal reaches a minimum amplitude when the second driver's drive amplitude modulated signal reaches a maximum amplitude, and wherein the meter electronics is further configured to measure the relative phase between a first pickoff and a second pickoff and determine a relative phase of a right eigenvector for the flow tube.

Aspects

An aspect of a method according to an embodiment comprises: placing a material in a flow tube while exciting a vibration mode of the flow tube, wherein exciting the vibration mode of the flow tube comprises the steps of: periodically driving a first driver with a first signal; periodically driving a second driver with a second signal, wherein the second driver is driven essentially in phase with the first driver, wherein the first driver's drive amplitude modulated signal reaches a maximum amplitude when the second driver's drive amplitude modulated signal reaches a minimal amplitude, and the first driver's drive amplitude modulated signal reaches a minimum amplitude when the second driver's drive amplitude modulated signal reaches a maximum amplitude; measuring the relative phase between a first pickoff and a second pickoff; and determining a relative phase of a right eigenvector for the flow tube.

Preferably, the method further comprises: measuring a frequency shift that occurs between when the first driver's drive amplitude modulated signal reaches a maximum amplitude and when the second driver's drive amplitude modulated signal reaches a maximum amplitude; offsetting the first signal with a phase shift; adjusting the first signal phase offset until the frequency shift is substantially undetectable; and determining the relative phase of the left eigenvector coefficients from the first signal phase offset necessary for rendering the frequency shift substantially undetectable.

Preferably, the step of determining an actual flow of the material through the flow tube further comprises: determining an uncorrected flow of the material through the flow tube using the relative phase of the right eigenvector; and determining a zero offset for the flow of the material through the flow tube by comparing the uncorrected flow with the actual flow.

Preferably, the method further comprises determining a material flow through the flow tube using the relative phase of the right eigenvector corrected by the zero offset.

Preferably, the method further comprises determining the relative phase of a right eigenvector; and determining a zero offset for the flow of the material through the flow tube by weighted averaging the relative phase of the right eigenvector with the relative phase of the left eigenvector.

Preferably, the method further comprises estimating a frequency shift caused by the driver cycling; and relating the frequency shift to flow.

Preferably, the frequency is estimated with a frequency modulated second-order infinite impulse response adaptive notch filter.

Preferably, the method further comprises inputting a notch filter sharpness (a) parameter into the meter electronics; inputting a notch filter modulation frequency (fm) parameter into the meter electronics; determining a notch filter adaptation rate (λ) parameter based on the notch filter modulation frequency (fm) parameter and the sharpness (a) parameter; and inputting a pickoff signal into the adaptive notch filter, wherein the adaptive notch filter has a center frequency adapted to minimize filter output.

Preferably, an output of the notch filter is demodulated at the cycling frequency.

Preferably, the method further comprises co-locating the first driver with the first pickoff sensor; and co-locating the second driver with the second pickoff sensor.

Preferably, the step of periodically driving the first driver with the first signal comprises sinusoidally driving the first driver, and wherein the step of periodically driving the second driver with the first signal comprises sinusoidally driving the second driver.

An aspect of a method according to an embodiment comprises: flowing a material through a flow tube while periodically exciting a vibration mode of the flow tube such that a first driver's drive amplitude modulated signal reaches a maximum amplitude when a second driver's drive amplitude modulated signal reaches a minimal amplitude, and the first driver's drive amplitude modulated signal reaches a minimum amplitude when the second driver's drive amplitude modulated signal reaches a maximum amplitude; measuring the relative motion of the vibrating flow tube; measuring a relative phase of a right eigenvector while exciting the vibration mode of the flow tube; determining the material flow through the flow tube using the relative phase of a right eigenvector corrected by a zero offset; determining a new zero offset without stopping the material flow through the flow tube using a relative phase of a left eigenvector for the flow tube; and determining the material flow through the flow tube using the relative phase of a right eigenvector corrected by the new zero offset.

Preferably, the method further comprises co-locating the first driver with the first pickoff sensor; and co-locating the second driver with the second pickoff sensor.

According to an aspect, a vibratory flowmeter comprises: a flowmeter assembly including one or more flow tubes and first and second pickoff sensors; first and second drivers configured to vibrate the one or more flow tubes; and meter electronics coupled to the first and second pickoff sensors and coupled to the first and second drivers, with the meter electronics being configured to provide a first signal to the first driver and a second signal to the second driver wherein the second driver is driven essentially in phase from the first driver, wherein the first driver's drive amplitude modulated signal reaches a maximum amplitude when the second driver's drive amplitude modulated signal reaches a minimal amplitude, and the first driver's drive amplitude modulated signal reaches a minimum amplitude when the second driver's drive amplitude modulated signal reaches a maximum amplitude, and wherein the meter electronics is further configured to measure the relative phase between a first pickoff and a second pickoff and determine a relative phase of a right eigenvector for the flow tube.

Preferably, the meter electronics are configured to measure a frequency shift that occurs between when the first driver's drive amplitude modulated signal reaches a maximum amplitude and when the second driver's drive amplitude modulated signal reaches a maximum amplitude, to offset the first signal with a phase shift, to adjust the first signal offset until the frequency shift is substantially undetectable, and determine the relative phase of the left eigenvector coefficients from the first signal offset necessary for rendering the frequency shift substantially undetectable.

Preferably, the meter electronics are further configured to determine an uncorrected flow of the material through the one or more flow tubes using the relative phase of the right eigenvector and to determine a zero offset for the flow of the material through the one or more flow tubes by comparing the uncorrected flow with the actual flow.

Preferably, the meter electronics are further configured to determine a material flow through the one or more flow tubes using the relative phase of the right eigenvector corrected by the zero offset.

Preferably, the meter electronics are further configured to determine the relative phase of a right eigenvector and to determine a zero offset for the flow of the material through the one or more flow tubes by weighted averaging the relative phase of the right eigenvector with the relative phase of the left eigenvector.

Preferably, the meter electronics are further configured to estimate a frequency shift caused by the driver cycling, and relating the frequency shift to flow.

Preferably, the vibratory flowmeter comprises a frequency modulated second-order infinite impulse response adaptive notch filter with the meter electronics configured to perform the frequency shift estimate.

Preferably, the meter electronics are further configured to receive a notch filter sharpness parameter and a notch filter modulation frequency, wherein the meter electronics is configured to determine a notch filter adaptation rate parameter based on the sharpness parameter and the notch filter modulation frequency; and to receive an a pickoff signal in the adaptive notch filter, wherein the adaptive notch filter has a center frequency adapted to minimize filter output.

Preferably, an output of the notch filter is demodulated at the cycling frequency.

Preferably, the first driver is co-located with the first pickoff sensor, and the second driver is co-located with the second pickoff sensor.

Preferably, the first signal comprises a sinusoid.

Preferably, the filter comprises a plurality of adaptable filter coefficients.

DETAILED DESCRIPTION

FIGS. 1-11 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Residual flexibility, electromagnetic crosstalk and electronic measurement system characteristics all contribute to zero-offset. One interpretation of these effects is that they introduce error in the measurement of the right eigenvector phase. If the drive mode (right eigenvector) could be measured exactly, non-proportional damping would be the only effect causing zero offset and this error would be easily distinguished from flow effects using the left and right eigenvector Δt information.

Figure 1:
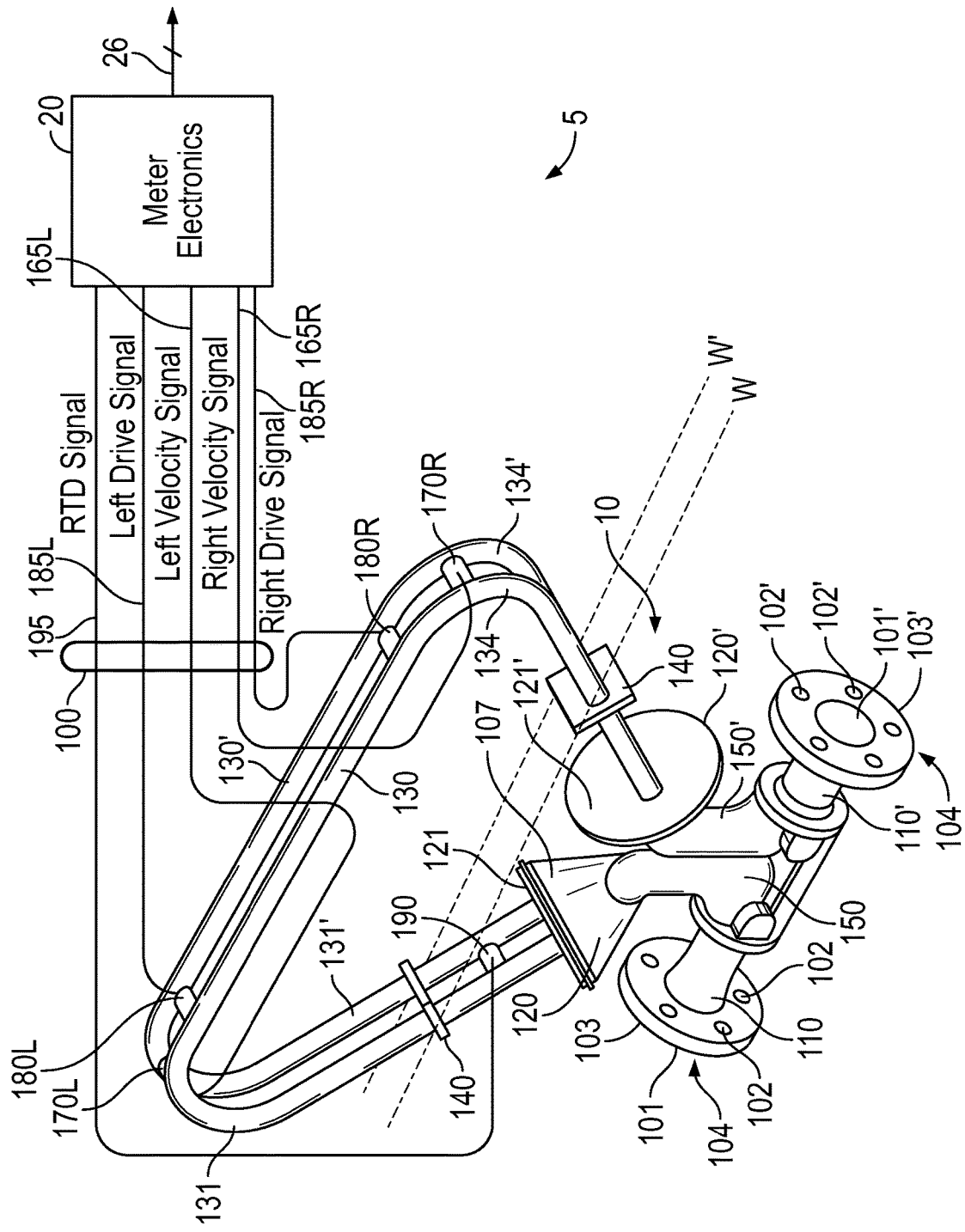
FIG. 1 is a vibratory flowmeter according to an embodiment.

FIG. 1 shows a vibratory flowmeter 5 according to an embodiment. The flowmeter 5 comprises a sensor assembly 10 and meter electronics 20 coupled to the sensor assembly 10. The sensor assembly 10 responds to mass flow rate and density of a process material. The meter electronics 20 is connected to the sensor assembly 10 via the leads 100 to provide density, mass flow rate, and temperature information over a communication link 26, as well as other information. A Coriolis flowmeter structure is described, although it is apparent to those skilled in the art that the present invention could also be operated as a vibrating tube densitometer.

The sensor assembly 10 includes manifolds 150 and 150', flanges 103 and 103' having flange necks 110 and 110', parallel flow tubes 130 and 130', first and second drivers 180L and 180R, and first and second pickoff sensors 170L and 170R. The first and second drivers 180L and 180R are spaced apart on the one or more flow tubes 130 and 130'. In addition, in some embodiments the sensor assembly 10 may include a temperature sensor 190. The flow tubes 130 and 130' have two essentially straight inlet legs 131 and 131' and outlet legs 134 and 134' which converge towards each other at the flow tube mounting blocks 120 and 120'. The flow tubes 130 and 130' bend at two symmetrical locations along their length and are essentially parallel throughout their length. The brace bars 140 and 140' serve to define the axis W and the substantially parallel axis W' about which each flow tube oscillates. It should be noted that in an embodiment, the first driver 180L may be collocated with the first pickoff sensor 170L, and the second driver 180R may be collocated with the second pickoff sensor 170R.

The side legs 131, 131' and 134, 134' of the flow tubes 130 and 130' are fixedly attached to flow tube mounting blocks 120 and 120' and these blocks, in turn, are fixedly attached to the manifolds 150 and 150'. This provides a continuous closed material path through the sensor assembly 10.

When the flanges 103 and 103', having holes 102 and 102' are connected, via the inlet end 104 and the outlet end 104' into a process line (not shown) which carries the process material that is being measured, material enters the end 104 of the meter through an orifice 101 in the flange 103 and is conducted through the manifold 150 to the flow tube mounting block 120 having a surface 121. Within the manifold 150 the material is divided and routed through the flow tubes 130 and 130'. Upon exiting the flow tubes 130 and 130', the process material is recombined in a single stream within the manifold 150' and is thereafter routed to the exit end 104' connected by the flange 103' having bolt holes 102' to the process line (not shown).

The flow tubes 130 and 130' are selected and appropriately mounted to the flow tube mounting blocks 120 and 120' so as to have substantially the same mass distribution, moments of inertia, and Young's modulus about the bending axes W-W and W'-W', respectively. These bending axes go through the brace bars 140 and 140'. Inasmuch as the Young's modulus of the flow tubes change with temperature, and this change affects the calculation of flow and density, the resistive temperature detector (RTD) 190 is mounted to the flow tube 130', to continuously measure the temperature of the flow tube. The temperature dependent voltage appearing across the RTD 190 may be used by the meter electronics 20 to compensate for the change in the elastic modulus of the flow tubes 130 and 130' due to any changes in flow tube temperature. The RTD 190 is connected to the meter electronics 20 by the lead 195.

Figure 2A:
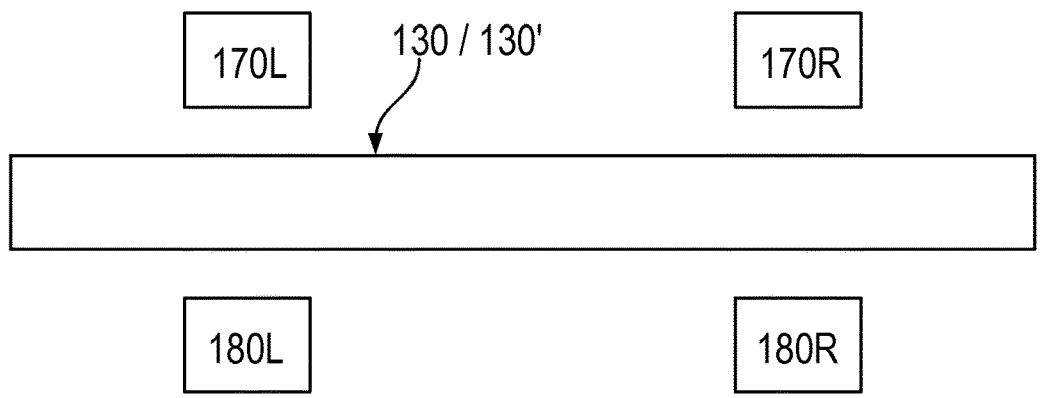
FIG. 2A is a top view of a flow tube in an un-deflected position in an example embodiment of the invention.
Figure 2B:
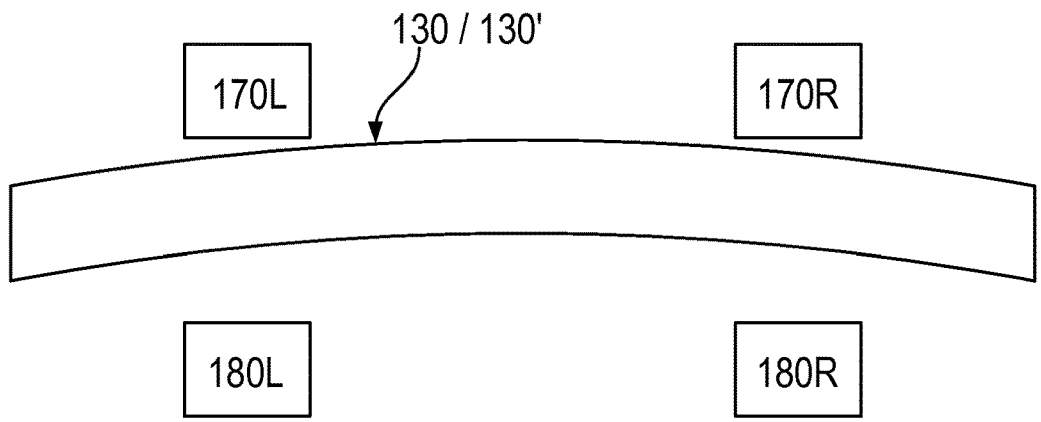
FIG. 2B is a top view of a flow tube in a deflected position corresponding to the main bending mode in an example embodiment of the invention.
Figure 2C:
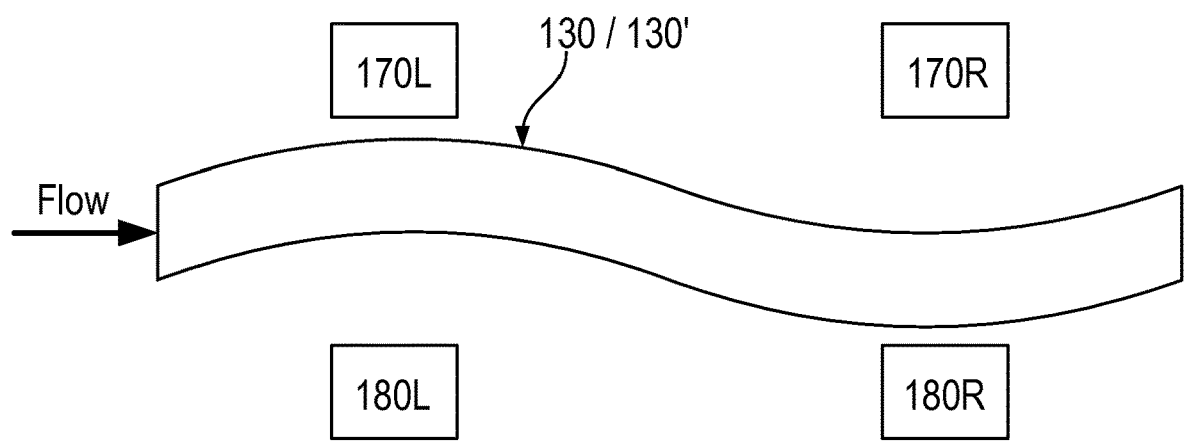
FIG. 2C is a top view of a flow tube in a deflected position corresponding to a twisting mode induced by Coriolis forces in an example embodiment of the invention.

FIGS. 2A-2C show a top view of a flow tube 130, 130' configured to contain a material flowing therethrough. 180L and 180R are two drivers (also called actuators) spaced along the flow tube 130, 130'. In the preferred mode, the two drivers are spaced symmetrically around the axial center of the flow tube. The drivers are configured to impart a force to the flow tube 130, 130' to excite a plurality of vibration modes in the flow tube 130, 130'. The force may be substantially coherent (e.g. confined to a narrow frequency) or may be broadband. The drivers can be such known means as a magnet attached to the flow tube, and a coil attached to a reference, through which an oscillating current is passed, for example, without limitation.

170L and 170R depict two sensors (also called pickoffs) co-located with drivers 180L and 180R. The sensors are configured to produce a plurality of signals representing the location and motion of the flow tube 130, 130'. The sensors may include a variety of devices, such as coil-type velocity transducers, optical or ultrasonic motion sensors, laser sensors, accelerometers, inertial rate sensors and the like. In this embodiment there are two sensors shown with each sensor co-located with one of the drivers 180L, 180R. Other configurations having more than two sensors are also possible.

FIG. 2A shows the flow tube 130, 130' in an un-deflected state. By driving the actuators with equal power, the main bending mode of the flow tube can be excited. U.S. Pat. No. 6,092,429, entitled "Driver for Oscillating a Vibrating Flow Tube", which is assigned on its face to Micro Motion, Inc., and hereby incorporated by reference, discloses drivers 180L, 180R configured to excite different modes of vibration in a flow tube. FIG. 2B shows the flow tube 130, 130' in a deflected state corresponding to the main bending mode of the flow tube. This vibration mode also corresponds to a condition when there is no flow of material through the flow tube. The deflection of the flow tube 130, 130' in FIGS. 2B and 2C have been magnified for clarity. The actual deflections of flow tube 130, 130' would be much smaller. When material is flowing through the vibrating flow tube 130, 130', the flowing material causes Coriolis forces to be generated. The Coriolis forces deflect the flow tube 130, 130' and excite additional vibration modes. FIG. 2C shows the main vibration mode excited by the Coriolis forces. The relative phase difference detected between sensor 170L and sensor 170R can be used to determine the material flow through the flow tube 130, 130'. In no-flow condition (as depicted in FIG. 2B), there is no phase difference due to flow detected between 170L and 170R. It should be noted, however, that there may be phase differences due to zero-offset conditions. Once material is flowing through the flow tube 130, 130', there will be a phase difference between 170L and 170R, which is due to flow. The measured phase difference detected between 170L and 170R is a measure of the relative phase of the right eigenvector of the system and is proportional to the material flow through the flow tube. Let $\theta_R$ equal the relative phase of the right eigenvector, $\theta_1$ be the measured phase of the vibration of the flow tube at sensor 170L, and $\theta_2$ be the measured phase of the vibration of the flow tube at sensor 170R, then:

$$\theta_R = \theta_1 - \theta_2 \quad (10)$$

A time difference, $\Delta t$, can be calculated from the phase difference by dividing by the vibration frequency $\omega$.

$$\Delta t = (\theta_1 - \theta_2)/\omega \quad (11)$$

The time difference $\Delta t$ is also proportional to the material flow through the flow tube and is a measurement typically used in mass flowmeters. A more accurate determination for the material flow through the flow tube 130, 130' can be calculated by correcting the measured material flow with a zero-offset amount, to derive a corrected $\Delta t$, $\Delta t_C$:

$$\Delta t_C = \Delta t - \text{ZeroOffset} \quad (12)$$

In one example embodiment of the invention, during normal operations, both drivers 180L, 180R are used to excite the main bending mode of the flow tube. An example of the material flow through the flow tube is determined by measuring the relative phase of the right eigenvector, converting to a $\Delta t$ domain, $\Delta t_R$, and correcting this value with a zero-offset correction amount to determine a corrected $\Delta t_R$, $\Delta t_{RC}$:

$$\Delta t_{RC} = \Delta t_R - \text{ZeroOffset} \quad (13)$$

In an embodiment, the flow tube is excited by periodically driving a first driver and periodically driving the second driver, wherein the first and second drivers are amplitude modulated out of phase from each other. In an embodiment, the drivers 180L, 180R are both periodically driving with a frequency corresponding to resonance. The drive signals are amplitude modulated at a much lower frequency. This lower frequency is the cycling frequency at which phase/frequency shift is later demodulated. The drive amplitude modulation signals (at the cycling frequency) are out of phase. The drive signal to each driver at the resonance/drive frequency are essentially identical signals, and are multiplied by the corresponding modulation signal. The periodic sweep may be sinusoidal, square, saw-toothed, etc. Measurements are taken of the phase between the driving signal and the vibration at positions on the flow tube. These measurements are used to determine the relative phase of the left eigenvector of the system. In an embodiment, a frequency shift that occurs between when the first driver's (180L) drive amplitude modulated signal reaches a maximum amplitude and when a second driver's (180R) drive amplitude modulated signal reaches a maximum amplitude is measured, and this frequency shift is input into meter electronics 20. The drive signal driving the first driver 180L is then offset with a phase shift. The frequency shift which occurs between when the first driver's (180L) drive amplitude modulated signal reaches a maximum amplitude and when a second driver's (180R) drive amplitude modulated signal reaches a maximum amplitude is then measured. If the frequency shift is approximately zero, no adjustments need be made. However, if a frequency shift which occurs between when the first driver's (180L) drive amplitude modulated signal reaches a maximum amplitude and when a second driver's (180R) drive amplitude modulated signal reaches a maximum amplitude is still detectable, then the first signal is offset again until the frequency shift which occurs between when the first driver's (180L) drive amplitude modulated signal reaches a maximum amplitude and when a second driver's (180R) drive amplitude modulated signal reaches a maximum amplitude is substantially undetectable. Once this occurs, the relative phase between the left eigenvector coefficients is calculated from the signal offset necessary for rendering the frequency shift approximately undetectable.

Figure 3:
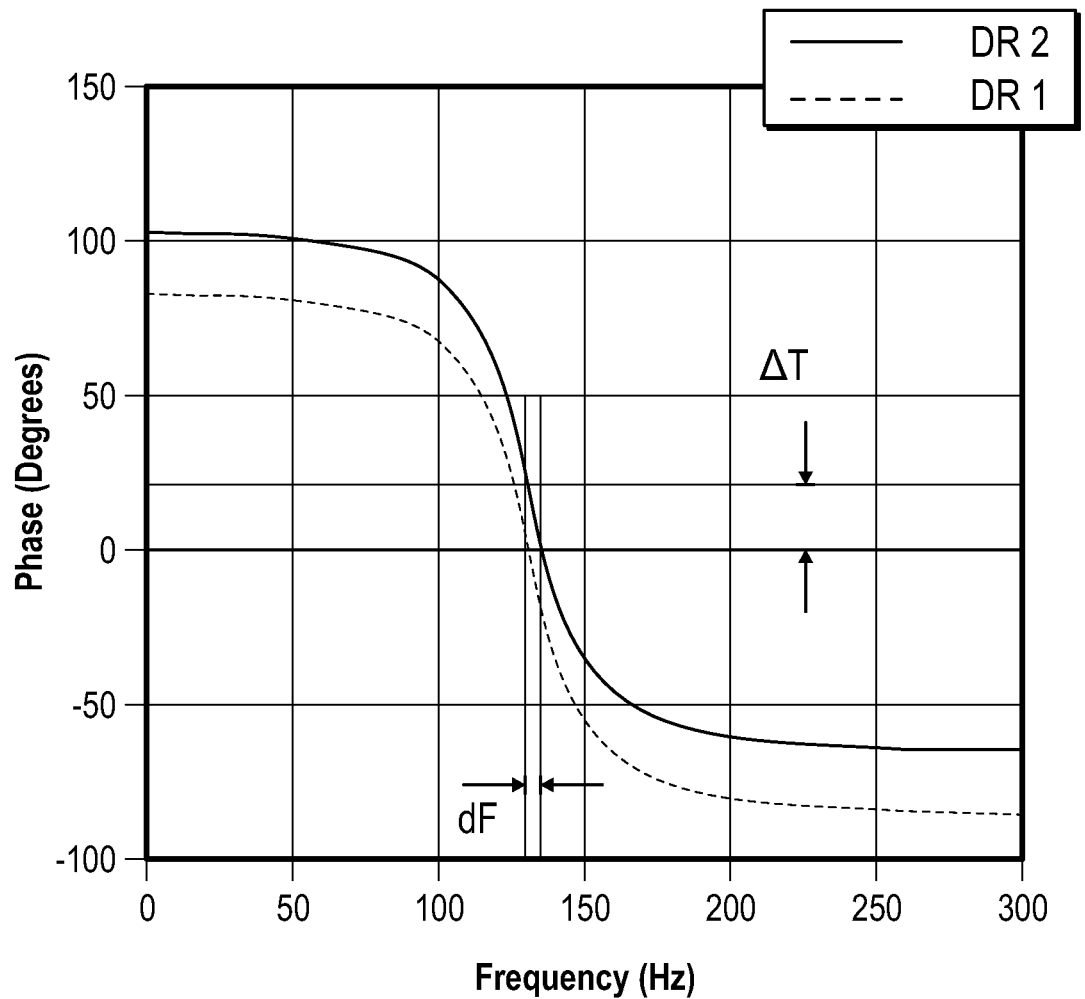
FIG. 3 illustrates an example of transforming a phase into a frequency.
Figure 4:
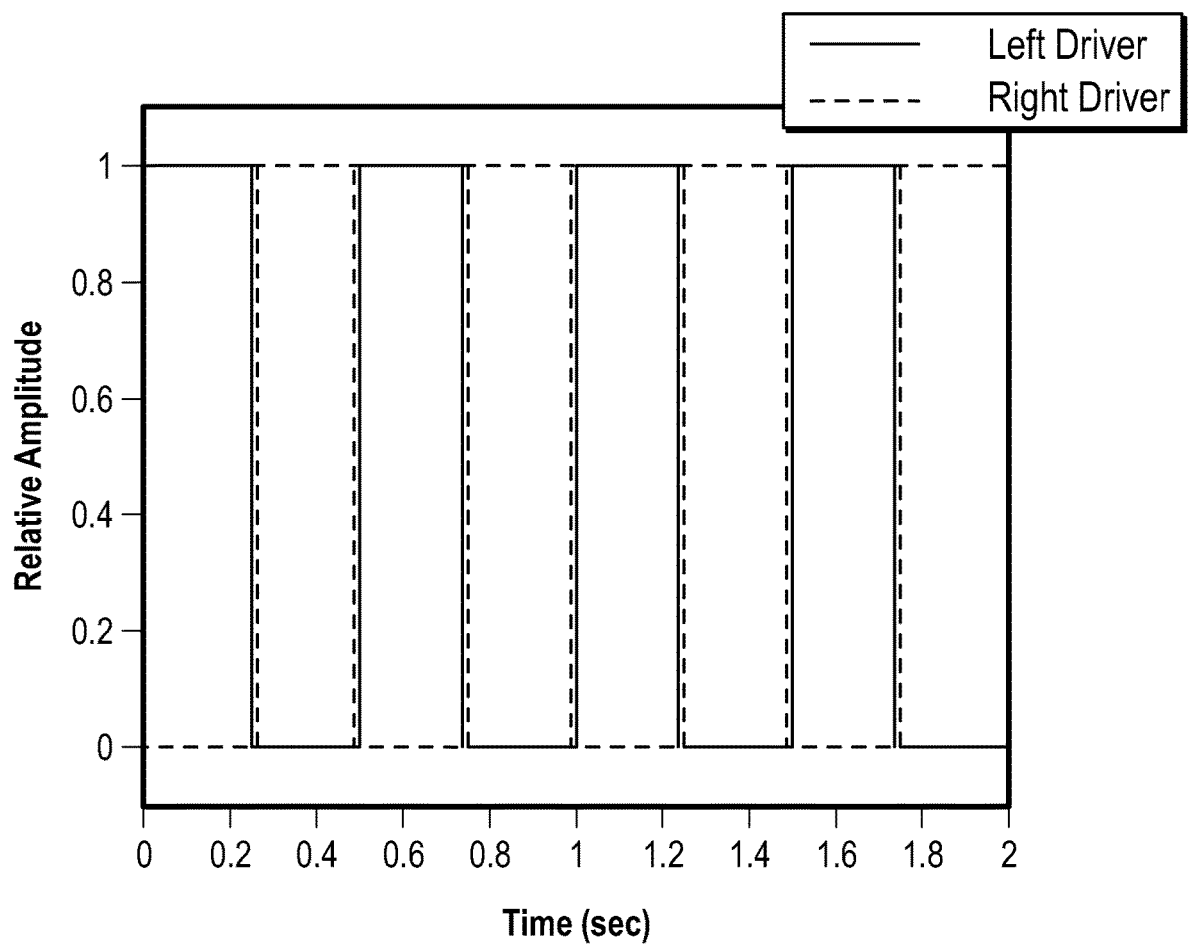
FIG. 4 illustrates prior art binary phase switching.

Turning to FIG. 3, it will be clear that a major difficulty inherent in this approach is that the system's transformation of phase into frequency is quite sharp, meaning that a very little frequency change occurs for a comparatively large phase change through the meter, which is additionally difficult to invert. As a result, the required frequency accuracy is quite exacting—on the order of nanoHertz. Prior art approaches to this phase switching effectively toggle between drivers 180L, 180R in a binary fashion. This is illustrated in FIG. 4. This requires a wait of at least several seconds (15-30) for the signal to decay before observing the new frequency from the newly toggled driver. Such a long delay is impractical for a usable system. When such an abrupt drive transition is used to continually cycle the drive back and forth, the transient response of the system to the transitions never actually totally decays, which ends up obscuring the desired drive frequency variation. When the flowmeter 5 is driven with a closed-loop feedback signal, such as when one or more pickoff signals is scaled and fed back to generate the drive signal, this characteristic of phase to frequency conversions is particularly pronounced. Under this feedback drive scheme, something that would otherwise be a phase change in the open-loop characteristics of the system instead manifests as a shift in the drive frequency. This is inherent in the nature of a feedback drive system since phase in the open loop system must, by definition, be made to match the phase in the feedback portion of the system, thus matching these phases requires a change in drive frequency, which automatically falls out of the closed-loop controller. Since, as noted above, a relatively large amount of phase change manifests as a comparatively small frequency shift, observing phase effects in a closed loop drive is prohibitively challenging, as the frequency changes are generally too small to detect.

Figure 5A:
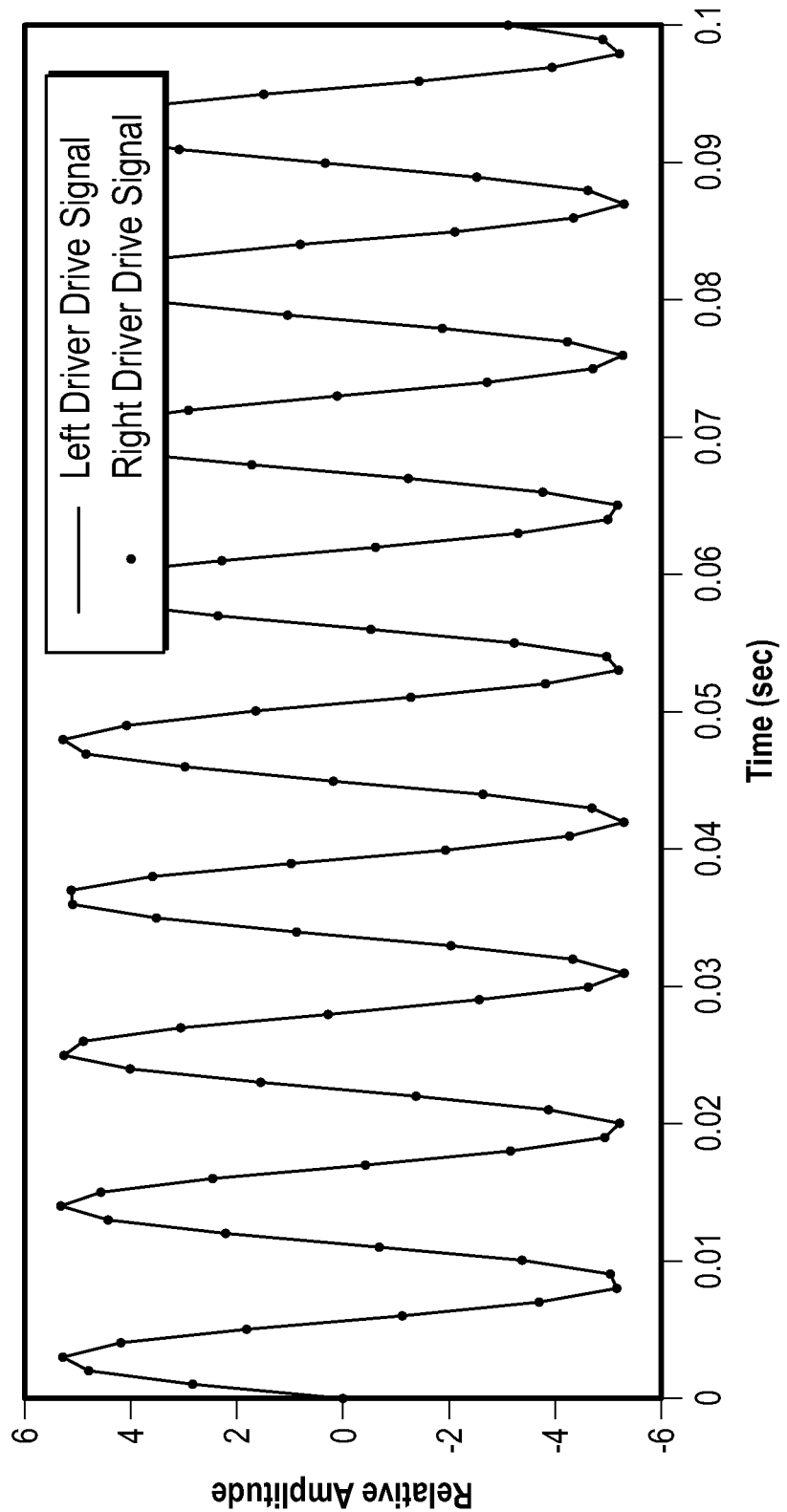
FIG. 5A illustrates drive signals according to an embodiment.
Figure 5B:
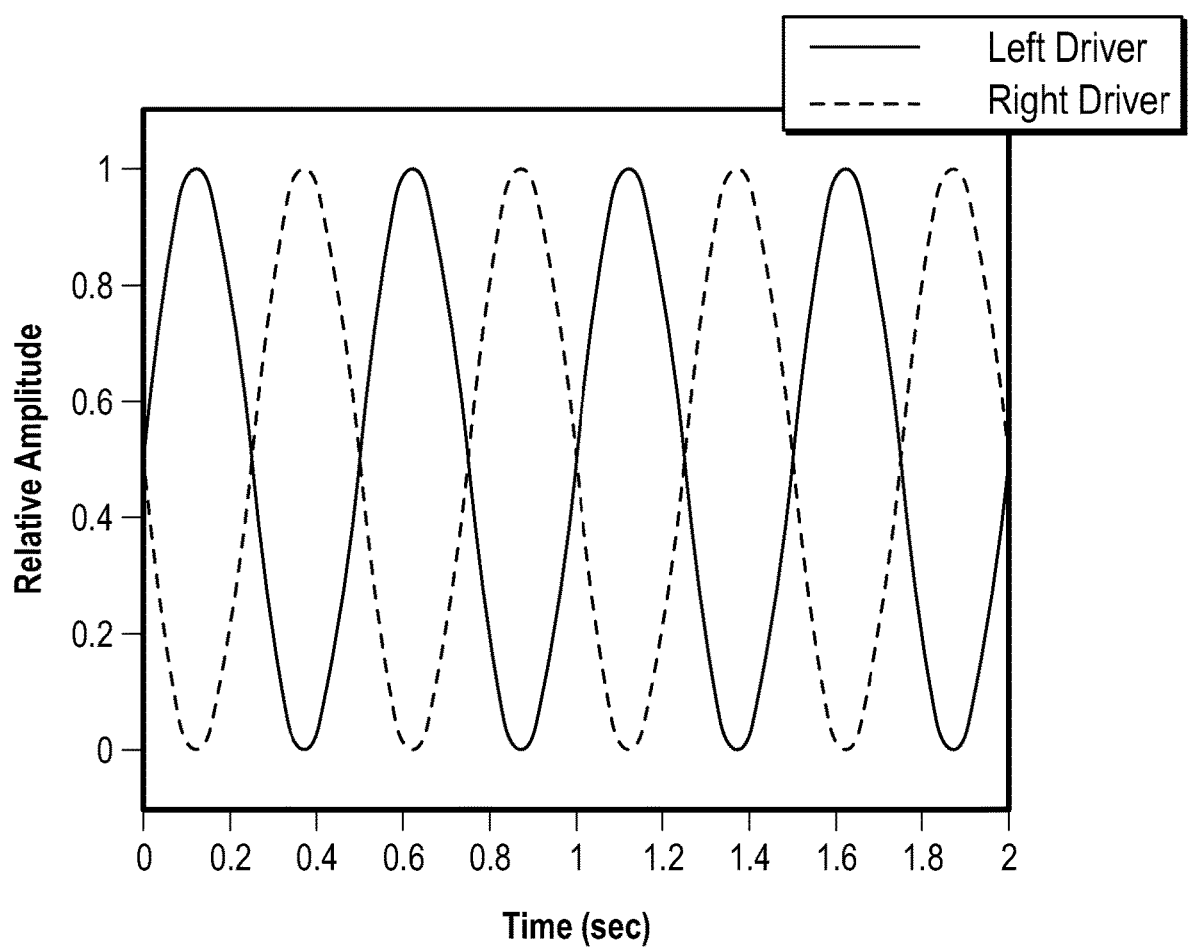
FIG. 5B illustrates periodic phase switching according to an embodiment.
Figure 5C:
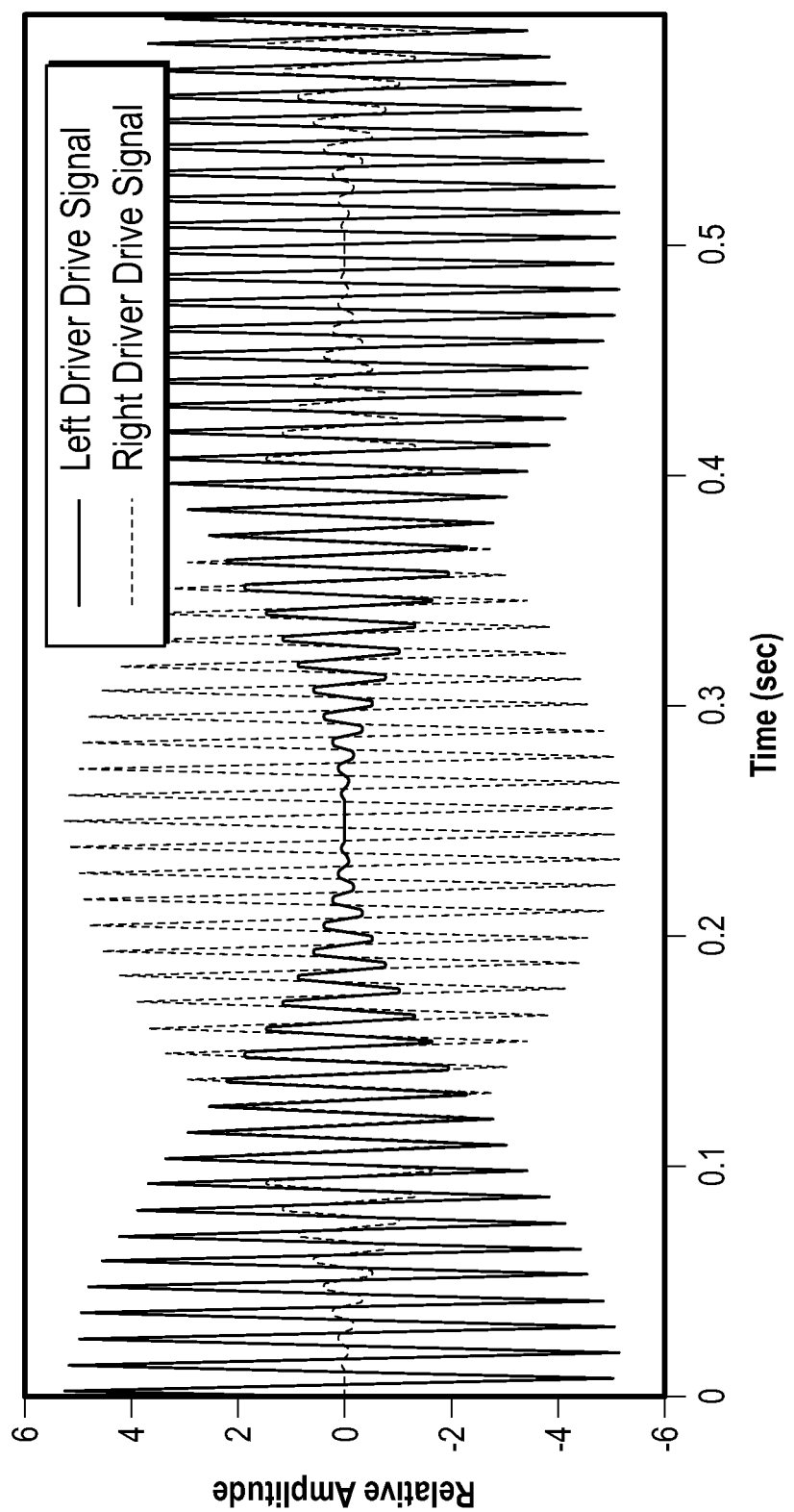
FIG. 5C illustrates an amplitude modulated signal according to an embodiment.

Turning to FIGS. 5A-5C, an embodiment is illustrated wherein the drive amplitudes are cycled periodically to minimize transient signals. This approach minimizes the slope of the drive amplitude changes in time (given a required cycling frequency), thereby minimizing impulsive shocks to the system. With this approach, the drive is entirely on one driver or the other only momentarily. FIG. 5A shows the essentially in-phase nature of the two drive signals. FIG. 5B shows the amplitude modulation signals. FIG. 5C shows the amplitude modulated drive signals, where the first driver's amplitude reaches a maximum when the second driver's amplitude reaches a minimum, and the first driver's amplitude reaches a minimum when the second driver's amplitude reaches a maximum.

Figure 6:
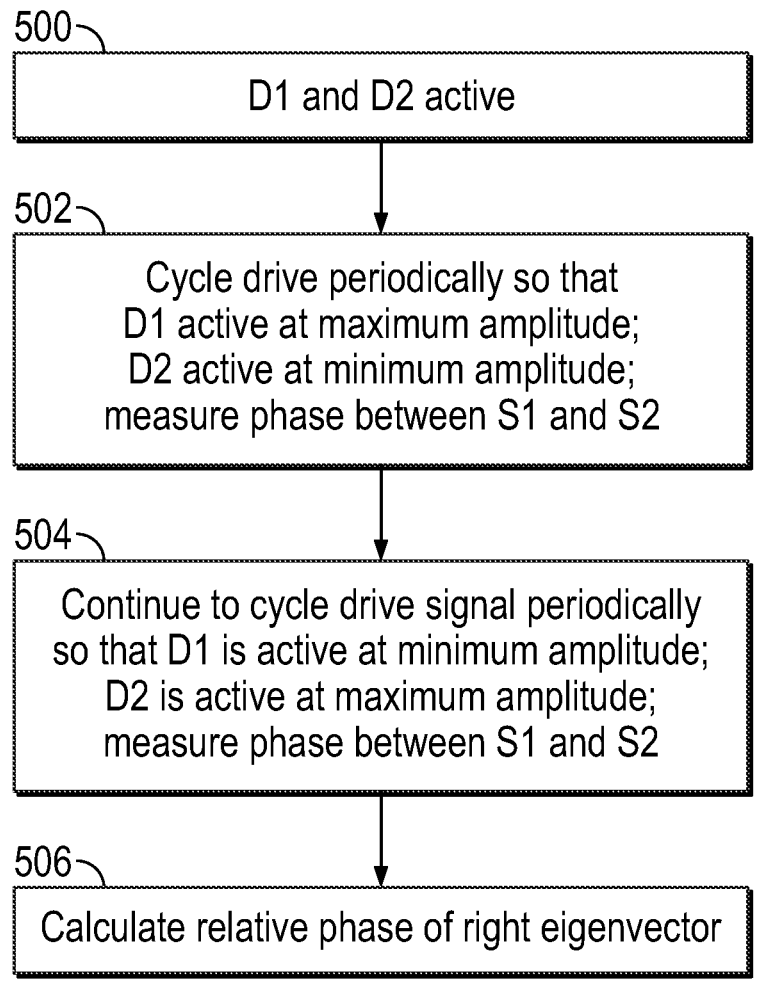
FIG. 6 is a flow chart illustrating determining a relative phase of a right eigenvector according to an embodiment.

FIG. 6 is a flow chart illustrating the determination of a relative phase of a right eigenvector of the system in an example embodiment. At step 500, during normal operations, both drivers 180L, 180R are used to excite the vibration of the flow tube. The drivers 180L and 180R are cycled periodically, wherein when 180L is at a maximal amplitude, 180R is driven at a minimal amplitude, and vice versa. At step 502, driver 180L is cycled to excite the vibration of the flow tube at a maximum amplitude, while 180R is cycled to excite the vibration of the flow tube at a minimal amplitude. During this time, the phase between the pickoff sensor 170L and pickoff sensor 170R is measured. This will be called phase difference $\theta_1$.

In step 504, as the drives are cycled periodically, the driver 180L excites the vibration of the flow tube at a minimum amplitude, while 180R excites the vibration of the flow tube at a maximal amplitude. The phase between the pickoff sensor 170L and pickoff sensor 170R is measured. It should be noted that the phase difference between pickoff sensors 170R, 170L may be continually measured, or may be measured at discrete time points. Regardless, this will be called phase difference $\theta_2$.

At step 506, the relative phase of the right eigenvector is calculated. In an embodiment, system noise and phase due to residual flexibility of higher frequency modes is attenuated by weighted averaging the phase signals, such that the average phase, $\theta_{AR}$, may, in an embodiment, be calculated as:

$$\theta_{AR} = \frac{(\theta_1 + \theta_2)}{2} \tag{14}$$

Other equations, other than equation (14) are contemplated, however.

Figure 7:
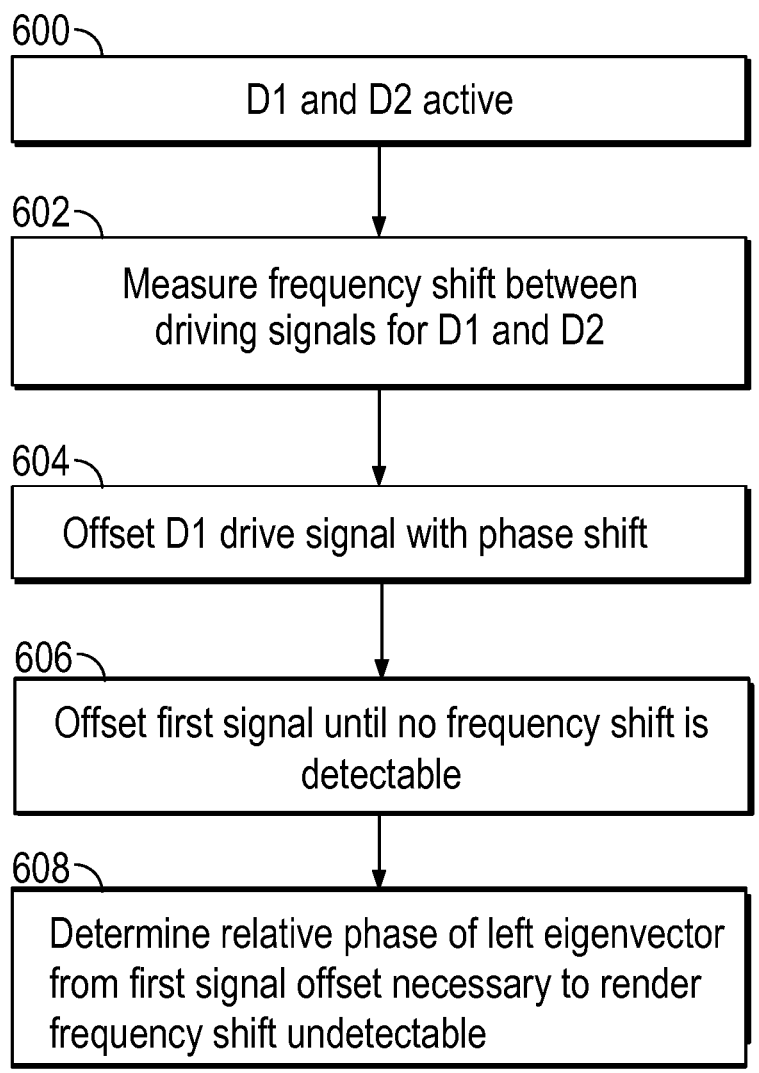
FIG. 7 is a flow chart illustrating determining a relative phase of a left eigenvector according to an embodiment.

FIG. 7 is a flow chart illustrating the determination of a relative phase of a left eigenvector in an example embodiment. At step 600, during normal operations, both drivers are used to excite the vibration of the flow tube. The drivers 180L and 180R are cycled periodically, wherein when 180L is at a maximal amplitude, 180R is driven at a minimal amplitude, and vice versa. At step 602, a frequency shift between the driving signal used by driver 180L and the driver 180R is measured.

At step 604, the first signal is offset with a phase shift as the drives are cycled periodically. At step 606, the first signal is offset until the frequency shift is substantially undetectable. At step 608, the relative phase of the left eigenvector coefficients is determined from the first signal offset necessary for rendering the frequency shift approximately undetectable.

Figure 8:
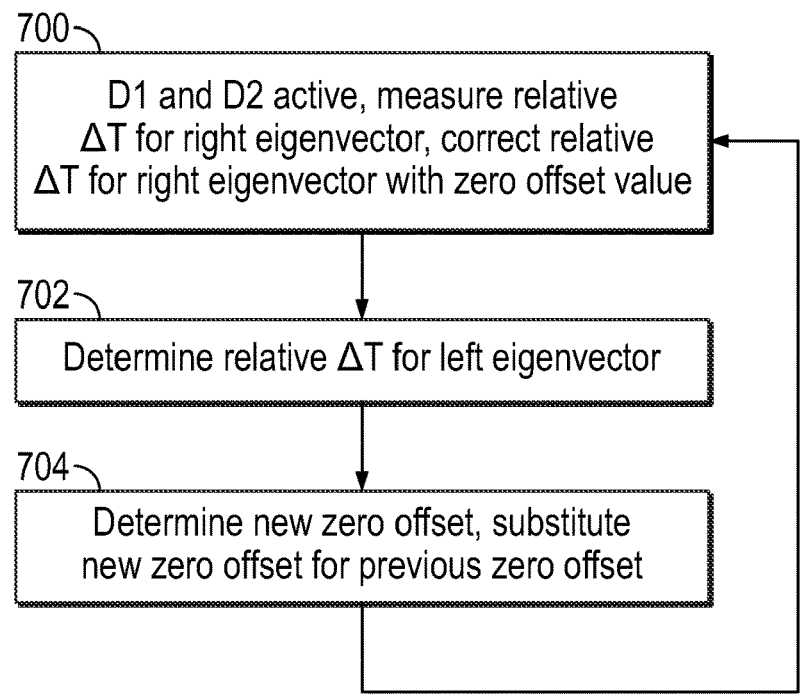
FIG. 8 is a flow chart illustrating a real time zero offset recalibration of a flowmeter during flow according to an embodiment.

FIG. 8 is a flow chart illustrating a real time zero offset recalibration of a flowmeter during flow in one example embodiment. In step 700, during normal operations, both drivers 180L, 180R are used to periodically excite the vibration of the flow tube. An uncorrected relative $\Delta t$ for the right eigenvector is determined. The uncorrected relative $\Delta t$ of the right eigenvector is then corrected by using a zero offset. The flow through the meter is determined using the corrected relative $\Delta t$ of the right eigenvector. Periodically, in step 702, the relative $\Delta t$ of the left eigenvector is determined. The relative $\Delta t$ of the left eigenvector may be corrected for residual flexibility and electronic crosstalk effects. In step 704, the relative $\Delta t$ of the left eigenvector and the uncorrected $\Delta t$ of the right eigenvector are used to determine a new zero offset. The new zero offset is substituted for the old zero offset and the process resumes at step 700. By calculating and substituting the new zero offset into the meter, the meter has been recalibrated for the zero flow condition during material flow through the meter.

In one example embodiment, the determination for when the re-calibration should occur may be done by using a fixed time interval between calibrations. In another example embodiment, a re-calibration may be done when changes in the environment or the piping system are detected. For example, when a change in temperature is greater than a threshold amount, a re-calibration may be performed. The determination for when re-calibration occurs may be a combination of a periodic timer and detecting changes in environment. The time period between recalibrations may be shorter for systems that require higher accuracy than for systems that have less stringent accuracy requirements. Switching between drivers 180L and 180R in order to measure the relative phase of the left eigenvector does not imply that the normal operation of the flowmeter has to be interrupted (i.e. measuring flow using $\Delta t$ of the right eigenvector). In yet another example, a flowmeter is simply monitored for changes to the zero, so an embodiment for a zero verification tool is contemplated. This is useful in a number of applications, such as custody transfer, for example without limitation, wherein the zero is not permitted to be changed, except under particular circumstances.

As noted, a problem encountered in prior art approaches, however, relates to isolating the phase effects due to switching drivers 180L, 180R from the other transient effects from the controller. In particular, when drivers 180L, 180R are switched abruptly, the system may react with unwanted transient responses. The drive controller tends to reinforce these step changes in the system. When this abrupt drive transition is used to continually cycle the drive back and forth, the transient response of the system to the transitions tends to never decay, so the desired drive frequency variation is obscured. Another issue is the sensitivity of the frequency measurement. If one simply examines the raw frequency signal when cycling drivers 180L, 180R, the changes of interest are obfuscated by noise effects. Signal processing methods and electronics are described in U.S. Pat. No. 5,734,112, which is assigned on its face to Micro Motion, Inc. and is hereby incorporated by reference.

Figure 9:
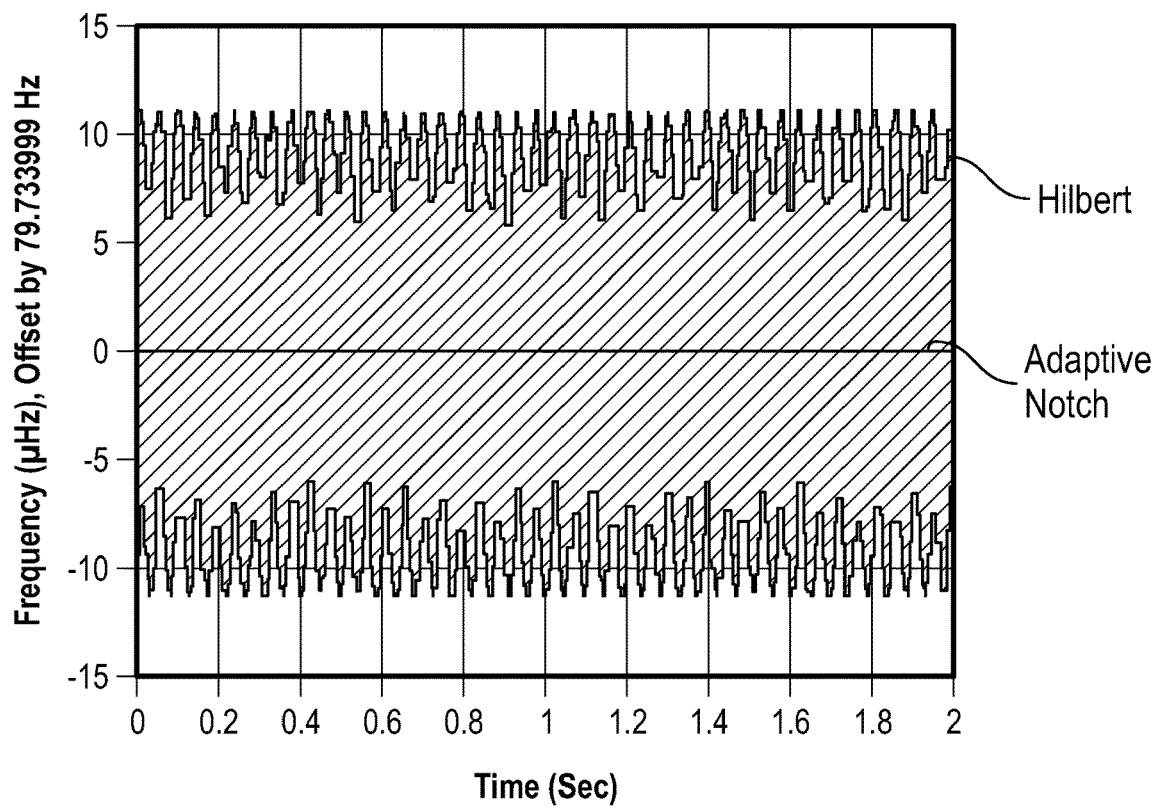
FIG. 9 illustrates a left-eigenvector-induced frequency comparison between a Hilbert filter and an adaptive notch filter according to an embodiment.

For the various $\Delta t$ calculations to be made, signal processors rely on frequency estimations of flow tube bending mode vibrations. A Hilbert filter-based approach for estimating frequency is known from the prior art, but proves too noisy for the accuracy desired. This sinusoidal cycling approach may, in an embodiment, be augmented with an improved frequency estimator filter. In particular, a modified adaptive notch frequency estimator is employed. The adaptive notch frequency estimator provides a far more accurate frequency estimate than a Hilbert filter. FIG. 9 illustrates a left-eigenvector-induced frequency variation using the two frequency estimators—a Hilbert filter (H) and adaptive notch filter (AN). The adaptive notch filter is much cleaner, which is particularly clear where the phase of the left eigenvector has been tuned out. The noise present when using the Hilbert filter has a standard deviation over 500 times greater than that of the adaptive notch filter.

In an embodiment, the adaptive notch filter comprises a frequency modulated second-order infinite impulse response filter that is applied to an incoming signal, with its center frequency adapted to minimize the output. For a purely tonal signal, this will be when the filter's frequency matches that of the input signal. For multi-tonal signals, the filter locks onto the largest tone present. Beyond the adapted center frequency, the filter's behavior is controlled by two design parameters: the sharpness of the filter, α, and the adaptation rate of the frequency, λ. In an embodiment, sharpness (α) is kept as a static design parameter, and typically defined during the manufacturing stage. The adaptation rate of the frequency (λ) parameter influences sensitivity to a frequency modulated signal. In an example embodiment, the adaptive notch filter's modulation frequency is defined according to the following expression:

$$f_m = \frac{0.155}{dt}\sqrt{(1-a)(1-\lambda)} \tag{15}$$

Where:
α=sharpness of filter
λ=adaptation rate of the frequency
dt=sample rate of the filter
fm=modulation frequency Thus, given a sample rate, a value for a, and a modulation frequency fin, the appropriate value for the adaptation rate of the frequency (λ) may be found as:

$$\lambda = 1 - \frac{(6.45 fm \cdot dt)^2}{1-\alpha} \tag{16}$$

In this manner, frequency modulation is tracked at a known modulation frequency several orders of magnitude more accurately than with a generic, prior art, adaptive notch filter.

Figure 10:
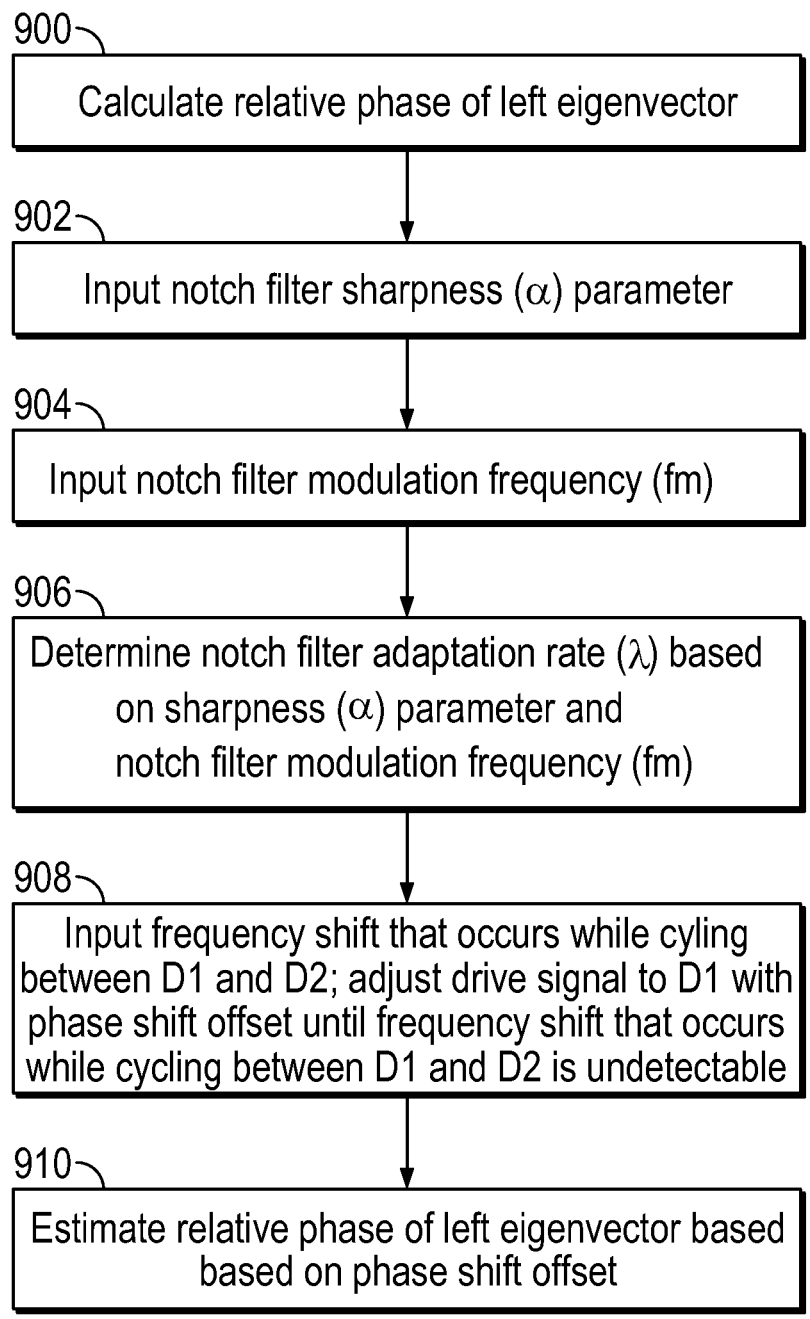
FIG. 10 is a flow chart illustrating an improved frequency modulated adaptive notch filter according to an embodiment.

FIG. 10 is a flow chart that illustrates the use of an improved frequency modulated adaptive notch filter according to an embodiment. From the relative phase of the left eigenvector, a frequency estimate is ultimately calculated. In step 900, the relative phase of the left eigenvector is calculated. In step 902, the sharpness parameter, a, is input into the filter, which corresponds to a response time of the filter. In an embodiment, this parameter is determined at the time of flowmeter assembly and verification. In step 904, the notch filter modulation frequency (fm) is input into the filter. In step 906, the adaptation rate parameter (λ) is calculated based on the sharpness (a) and notch filter modulation frequency (fm) parameters. In an example embodiment, expression (15) is employed for this calculation, but other expressions are contemplated, and nothing limits embodiments to expression (15). Step 908 corresponds to inputting the frequency shift that occurs between when the first driver's (180L) drive amplitude modulated signal reaches a maximum amplitude and when a second driver's (180R) drive amplitude modulated signal reaches a maximum amplitude, and offsetting the first drive signal with a phase shift offset. This entails adjusting the first signal offset until substantially no frequency shift is detectable. In step 910, the relative phase of the left eigenvector coefficients is determined from the first signal offset necessary for rendering the frequency shift substantially undetectable.

In another related embodiment, instead of utilizing a pure frequency estimator, as described above, a frequency-modulated signal is extracted at a known modulation frequency. Consider a frequency-modulated signal, with a known, fixed modulation at the frequency $\omega_c$:

$$y(t) = \cos((\omega_0 + \Delta\omega \cos(\omega_c t))t) \tag{17}$$

In an embodiment, a goal is to measure Δω, and one method for such a measurement comprises comparing signal y to a time-delayed version of itself, and computing the phase difference, φ:

$$\varphi = \angle \frac{y(t+\Delta t)}{y(t)} \tag{18}$$

Since phase is defined as the integral of frequency, in an example embodiment, without limitation, phase may be computed as:

$$\varphi(t) = \omega_0 \Delta t + \frac{\Delta\omega}{\omega_c}((\sin(\omega_c t)\cos(\omega_c \Delta t)) + \cos(\omega_c t)\sin(\omega_c \Delta t) - \sin(\omega_c t)) \tag{19}$$

Since the modulation frequency, $\omega_c$, is known, the time delay, Δt, is selected as a quarter period of the modulation frequency, so:

$$\omega_c \Delta t = \frac{\pi}{2} \tag{20}$$

Expression (19) simplifies to:

$$\varphi(t) = \omega_0 \Delta t + \frac{\Delta\omega}{\omega_c}(\cos(\omega_c t) - \sin(\omega_c t)) = \omega_0 \Delta t + \sqrt{2}\frac{\Delta\omega}{\omega_c}\cos\left(\omega_c t + \frac{\pi}{4}\right) \tag{21}$$

This represents a DC value plus a sinusoid at the modulation frequency, the amplitude of which is proportional to Δω. Therefore, the amplitude of the frequency modulation at the known modulation frequency may be extracted by comparing the phase of the signal with an appropriately delayed version of itself and calculating the amplitude of the resulting sinusoidal frequency modulation. It will therefore be obvious that this technique is sensitive to modulation at the expected frequency, yet provide rejection of the majority of out-of-band noise.

In the embodiments above, both drivers 180L, 180R are utilized to determine the relative Δt of the left eigenvector. In yet another embodiment, only a single driver may be used at a time. For example, driving a single driver, 180L, measuring the phase at a pickoff sensor, 170L, and then driving the other driver, 180R, and subsequently measuring the phase at the same pickoff, 170L, can be used to allow the unique contributions of each driver to be discerned. An inherent drawback on a lightly-damped flowmeter stems from the fact that it takes up to, and even potentially longer than, five minutes for the response from the first driver to decay, which is necessary before the second driver can be activated. In many real-world situations, this is a virtually useless approach due to the long time lag, as environmental conditions may change fast enough to render any measurements obsolete. Thus, a solution to this time lag problem is provided in an embodiment.

In an embodiment, driver forces are calibrated so to improve system accuracy. In traditional single-driver meters, the sensor is designed to be balanced, with the drive coil located at a node of the twist mode's modeshape. By doing so, it is extremely difficult for the driver to directly excite the twist mode, and thus direct twist mode excitation does not significantly influence the drive phase measured at the pickoff sensors 170L, 170R, thereby removing one potential source of zero error in the flow measurement. With a dual driver approach, however, the drivers 180L, 180R are not located at twist mode nodes, and thus there exists the risk of directly exciting the twist mode. Direct twist mode excitation is therefore a significant problem. The relative twist mode response (as compared to drive mode response) may change as a function of density and temperature. Thus, if the drive mode is relatively close to the twist mode, the relative response of the twist mode will increase. This is not a pure zero effect, but rather a flow error that is dependent, at least partially, on drive frequency. If the twist mode is not excited to begin with though, such as due to driver placement on single driver meters, this error source is eliminated.

Figure 11:
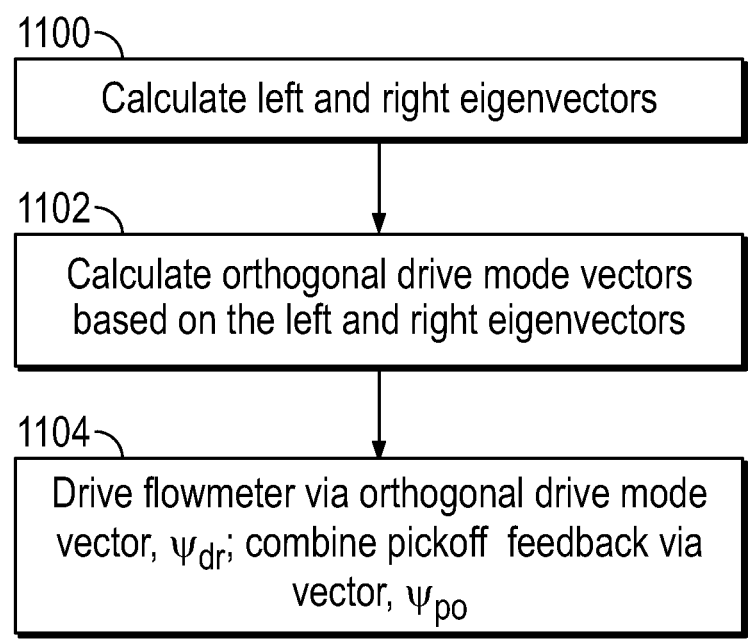
FIG. 11 is a flow chart illustrating a method to suppress a twist mode according to an embodiment.

Therefore, in an embodiment, a driver force projection vector ($\Psi_{dr}$) and a pickoff modal filter vector ($\Psi_{po}$) are selected that correct for any system gains and allow driving of the drive mode while suppressing the twist mode—the primary goal being the suppression of the twist mode at both the drivers 180L, 180R and the pickoff sensors 170L, 170R, as illustrated in FIG. 11. This is an improvement over the standard single-driver meter which inherently allowed only for suppression at the driver, but did nothing to prevent the pickoff sensors 170L, 170R from measuring the twist mode response.

In order to excite the drive mode without exciting the twist mode, the twist mode modeshapes (i.e. eigenvectors) from the resulting residue matrix are extracted in step 1100. With the twist mode left and right eigenvectors (i.e. pickoff and driver modeshapes) in hand, drive mode vectors are designed that are orthogonal, as shown in step 1102. In an embodiment, this is accomplished using the following equation:

$$\varphi_t^{(l)} = \begin{bmatrix} k_1 \\ -k_2 \end{bmatrix} \Rightarrow \Psi_{dr} = \begin{bmatrix} 1/k_1 \\ 1/k_2 \end{bmatrix} \quad (22)$$

$$\varphi_t^{(r)} = \begin{bmatrix} g_1 \\ -g_2 \end{bmatrix} \Rightarrow \Psi_{po} = \begin{bmatrix} 1/g_1 \\ 1/g_2 \end{bmatrix}$$

By driving a dual driver meter via the vector $\Psi_{dr}$ and combining the pickoff sensors 170L, 170R for feedback via the vector $\Psi_{po}$, as in step 1104, the desired suppression of the twist mode is realized, since:

$$\psi_{dr}^T \varphi_t^{(l)} = 1 - 1 = 0$$

$$\psi_{dr}^T \varphi_t^{(r)} = 1 - 1 = 0 \quad (23)$$

While it may be ideal to measure twist mode modeshapes, in an alternate embodiment, only the drive mode data is utilized. The approach is similar to that described above, but with an additional assumption that the meter being driven is balanced so the drive and twist mode shapes are generally:

$$\varphi_d = \begin{bmatrix} 1 \\ 1 \end{bmatrix} \text{ and } \varphi_t = \begin{bmatrix} 1 \\ -1 \end{bmatrix} \quad (24)$$

These are then corrupted only by the transducer gains, such that $$\varphi_d^{(l)} = \begin{bmatrix} k_1 \\ k_2 \end{bmatrix}, \varphi_t^{(l)} = \begin{bmatrix} k_1 \\ -k_2 \end{bmatrix} \quad (25)$$

$$\varphi_d^{(r)} = \begin{bmatrix} g_1 \\ g_2 \end{bmatrix}, \varphi_t^{(r)} = \begin{bmatrix} g_1 \\ -g_2 \end{bmatrix}$$

Thus, for a symmetric flowmeter, left and right eigenvectors are measured, as described above, so an estimate of the twist mode for left and right eigenvectors may also be estimated. From that point, the same approach as outlined above is utilized to arrive at a driver projection vector and a pickoff modal filter vector that suppress the twist mode. Either approach is applicable to meter calibration, either initial factory calibration or field calibrations. So to avoid directly exciting the twist mode, driver and/or pickoff gains are adjusted to obtain more stable flow estimates. Though these methods are well suited to dual driver systems, they are applicable to systems having greater than two drivers 180L, 180R and/or greater than two pickoff sensors 170L, 170R.

For a dual drive flowmeter, unwanted electronic zero drift due to drift between the front end circuitry of the left and right pickoff channels may be an issue that interferes with a flowmeter's accuracy. Of course, the zero drift may be compensated for by the methods described above, for example without limitation, but these methods alone do not address another source of inaccuracy known to affect flow measurements that stems from phase and amplitude drift on the analog-to-digital (A/D) converters and the input circuitry and digital-to-analog (D/A) converters and the corresponding output circuitry. In an embodiment, phase and amplitude drift associated with A/D and D/A converters is compensated for.

A/D converters typically receive an analog signal from their respective flow tube sensor output signals. A processor applies control signals to the A/D converters, and receives digitized sample values from the A/D converters. For example, without limitation, a processor may determine a Δt value from the phase difference between sampled channels. A D/A converter then converts the digital signal value into an analog signal proportional to a mass flow rate. One of ordinary skill in the art will readily recognize that clocking signals required by the various components may be generated by any well-known clock generation techniques such as crystal controlled oscillators, or any of several commercially available clock generation integrated circuits.

The A/D converters are typically embodied within a single integrated circuit with multiple converters and a single communication bus connection to a DSP processor. This helps assure that the phase relationship between the sampled signals is due to the Coriolis effects of the vibrating flow tubes rather than effects of signal trace routing on a printed circuit board to physically separate A/D converter circuits. Many such stereo A/D converter chips are known to those skilled in the art. One example of such a chip is the Crystal Semiconductor CS5329, a 2-channel stereo A/D converter device. These signal processing methods and electronics, as noted above, are more fully described in U.S. Pat. No. 5,734,112.

Input phase offset is simply an electronic zero, which is well-known in the art. A constant offset in phase between the two input channels can be simply subtracted out before converting a Δt signal to flow. Historically, input phase drift has largely been addressed by precise matching of the input circuitry components. Input amplitude offset, on the other hand, which is not a very large concern for a standard single drive flowmeter, is more important to address for dual drive meters. It is desirable to ensure that modal filter vectors derived from the pickoff signals are optimized. Even though pickoff locations—i.e. the eigenvector coefficients at the pickoff sensors 170L, 170R—are symmetric, the input circuitry and A/D converters for the pickoff sensors 170L, 170R could have a bias or offset between each other.

Similarly, input amplitude offset is not a very large concern for a standard single drive flowmeter and is usually neglected. Pickoff amplitude is used for drive control with the largest pickoff signal used as the amplitude feedback signal. Smart Meter Verification typically measures a fairly large difference between the right and left pickoff stiffnesses. This offset is addressed by normalizing the stiffnesses to a factory baseline stiffness for each pickoff, ignoring any amplitude offset.

It is desirable to ensure that the modal filter vectors as derived from the pickoff signals are optimized. This assumes that the pickoff locations—i.e. the eigenvector coefficients at the pickoff sensors 170L, 170R—are symmetric. However, the input circuitry and A/D converters for the pickoff sensors 170L, 170R could have a bias or offset between each other. A preliminary calibration of the input circuitry could be effectuated, and during this calibration step one pickoff may be fed into both channels simultaneously. A software gain can therefore be adjusted to ensure that the front end circuitry reads the same voltage. This calibration step is typically done before calculation of the modal filter vectors, and can be easily accomplished in a production environment. With the precise matching of the components necessary for minimizing phase drift, it can reasonably be expected that the amplitude drift would be negligible. In an embodiment, the current through the dual drivers is measured as an input, and the input circuitry and A/D converters for the current measurement may be calibrated as for pickoff input channels. Calibrating the current measurement may, in some embodiments, comprise additional hardware on the embedded electronics such as relays or externally accessible jumpering, for example without limitation.

An amplitude offset in the two output channels for the drivers 180L, 180R would excite the residual flexibility of the twist mode, resulting in an interfering signal. Calibrating the output circuitry is accomplished in an embodiment by sending the same signal into both drive channels. The measured currents could then be compared and a gain on one of the output channels may be adjusted until the measured currents are equal. This would ensure that the output currents for the two drivers 180L, 180R are equal, after which the force projection vectors as discussed above could be accurately calculated. Therefore, with proper matching of the electronics components/signals the amplitude drift would is negligible.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Thus, although specific embodiments of, and examples for, the invention are described herein for illustrative purposes, various equivalent modifications are possible within the scope of the invention, as those skilled in the relevant art will recognize. The teachings provided herein can be applied to other vibrating systems, and not just to the embodiments described above and shown in the accompanying figures. Accordingly, the scope of the invention should be determined from the following claims.

We claim:

1. A method, comprising:
    placing a material in a flow tube while exciting a vibration mode of the flow tube, wherein exciting the vibration mode of the flow tube comprises the steps of:
        periodically driving a first driver with a first signal;
        periodically driving a second driver with a second signal, wherein the second driver is simultaneously driven essentially in phase with the first driver, wherein the first driver's drive amplitude modulated signal reaches a maximum amplitude when the second driver's drive amplitude modulated signal reaches a minimal amplitude, and the first driver's drive amplitude modulated signal reaches a minimum amplitude when the second driver's drive amplitude modulated signal reaches a maximum amplitude;
    measuring the relative phase between a first pickoff and a second pickoff; and
    determining a relative phase of a right eigenvector for the flow tube;
    measuring a frequency shift that occurs between when the first driver's drive amplitude modulated signal reaches a maximum amplitude and when the second driver's drive amplitude modulated signal reaches a maximum amplitude;
    offsetting the first signal with a phase shift;
    adjusting the first signal offset until the frequency shift is substantially undetectable; and
    determining the relative phase of the left eigenvector coefficients from the first signal offset necessary for rendering the frequency shift substantially undetectable.

2. The method of claim 1, wherein the step of determining an actual flow of the material through the flow tube further comprises:
    determining an uncorrected flow of the material through the flow tube using the relative phase of the right eigenvector; and
    determining a zero offset for the flow of the material through the flow tube using the relative phase of the left eigenvector coefficients.

3. The method of claim 2, further comprising:
    determining a material flow through the flow tube using the relative phase of the right eigenvector corrected by the zero offset.
4. The method of claim 1, further comprising:
    determining the relative phase of a right eigenvector; and
    determining a zero offset for the flow of the material through the flow tube by weighted averaging the relative phase of the right eigenvector with the relative phase of the left eigenvector.
5. The method of claim 1, further comprising:
    estimating a frequency shift caused by the driver cycling; and
    relating the frequency shift to flow.
6. The method of claim 5, wherein the frequency is estimated with a frequency modulated second-order infinite impulse response adaptive notch filter.
7. The method of claim 6, further comprising:
    inputting a notch filter sharpness (a) parameter into the meter electronics;
    inputting a notch filter modulation frequency (fm) parameter into the meter electronics;
    determining a notch filter adaptation rate (k) parameter based on the notch filter modulation frequency (fm) parameter and the sharpness (a) parameter; and
    inputting a pickoff signal into the adaptive notch filter, wherein the adaptive notch filter has a center frequency adapted to minimize filter output.
8. The method of claim 6, wherein an output of the notch filter is demodulated at the cycling frequency.
9. The method of claim 1, further comprising:
    co-locating the first driver with the first pickoff sensor; and
    co-locating the second driver with the second pickoff sensor.
10. The method of claim 1, wherein the step of periodically driving the first driver with the first signal comprises sinusoidally driving the first driver, and wherein the step of periodically driving the second driver with the second signal comprises sinusoidally driving the second driver.
11. A method, comprising:
    simultaneously providing a first signal to the first driver and a second signal to the second driver, wherein the second driver is driven essentially in phase with the first driver;
    flowing a material through a flow tube while periodically exciting a vibration mode of the flow tube such that a first driver's drive amplitude modulated signal reaches a maximum amplitude when a second driver's drive amplitude modulated signal reaches a minimal amplitude, and the first driver's drive amplitude modulated signal reaches a minimum amplitude when the second driver's drive amplitude modulated signal reaches a maximum amplitude;
    measuring the relative motion of the vibrating flow tube;
    measuring a relative phase of a right eigenvector while exciting the vibration mode of the flow tube;
    determining the material flow through the flow tube using the relative phase of a right eigenvector corrected by a zero offset;
    determining a new zero offset without stopping the material flow through the flow tube using a relative phase of a left eigenvector for the flow tube; and
    determining the material flow through the flow tube using the relative phase of a right eigenvector corrected by the new zero offset.
12. The method of claim 11, further comprising:
    co-locating the first driver with the first pickoff sensor; and
    co-locating the second driver with the second pickoff sensor.
13. A vibratory flowmeter (5) comprising:
    a flowmeter assembly (10) including one or more flow tubes (130, 130') and first and second pickoff sensors (170L, 170R);
    first and second drivers (180L, 180R) configured to vibrate the one or more flow tubes (130, 130'); and
    meter electronics (20) coupled to the first and second pickoff sensors (170L, 170R) and coupled to the first and second drivers (180L, 180R), with the meter electronics (20) being configured to:
    simultaneously provide a first signal to the first driver (180L) and a second signal to the second driver (180R), wherein the second driver (180R) is driven essentially in phase with the first driver (180L), wherein the first driver's (180L) drive amplitude modulated signal reaches a maximum amplitude when the second driver's (180R) drive amplitude modulated signal reaches a minimal amplitude, and the first driver's (180L) drive amplitude modulated signal reaches a minimum amplitude when the second driver's (180R) drive amplitude modulated signal reaches a maximum amplitude;
    measure the relative phase between a first pickoff (170L) and a second pickoff (170R) and determine a relative phase of a right eigenvector for the flow tube; and
    measure a frequency shift that occurs between when the first driver's (180L) drive amplitude modulated signal reaches a maximum amplitude and when the second driver's (180R) drive amplitude modulated signal reaches a maximum amplitude, offset the first signal with a phase shift, adjust the first signal offset until the frequency shift is substantially undetectable, and determine the phase of the left eigenvector coefficients from the first signal offset necessary for rendering the frequency shift substantially undetectable.
14. The vibratory flowmeter (5) of claim 13, with the meter electronics (20) being further configured to determine an uncorrected flow of a material through the one or more flow tubes (130, 130') using the relative phase of the right eigenvector and to determine a zero offset for the flow of the material through the one or more flow tubes (130, 130') using the phase of left eigenvector coefficients.
15. The vibratory flowmeter (5) of claim 14, with the meter electronics (20) being further configured to determine a material flow through the one or more flow tubes (130, 130') using the relative phase of the right eigenvector corrected by the zero offset.
16. The vibratory flowmeter (5) of claim 13, with the meter electronics (20) being further configured to determine the relative phase of a right eigenvector and to determine a zero offset for the flow of the material through the one or more flow tubes (130, 130') by weighted averaging the relative phase of the right eigenvector with the relative phase of the left eigenvector.
17. The vibratory flowmeter (5) of claim 16, with the meter electronics (20) being further configured to estimate a frequency shift caused by the driver cycling, and relating the frequency shift to flow.
18. The vibratory flowmeter (5) of claim 17, comprising a frequency modulated second-order infinite impulse response adaptive notch filter with the meter electronics (20) configured to perform the frequency shift estimate.

19. The vibratory flowmeter (5) of claim 17, with the meter electronics (20) being further configured to receive a notch filter sharpness ($\alpha$) parameter and a notch filter modulation frequency (fm), wherein the meter electronics (20) is configured to determine a notch filter adaptation rate ($\lambda$) parameter based on the notch filter modulation frequency (fm) and the sharpness ($\alpha$) parameter; and to receive a pickoff signal in the adaptive notch filter, wherein the adaptive notch filter has a center frequency adapted to minimize filter output.

20. The vibratory flowmeter (5) of claim 19, wherein an output of the notch filter is demodulated at the cycling frequency.

21. The vibratory flowmeter (5) of claim 13, wherein the first driver (180L) is co-located with the first pickoff sensor (170L), and the second driver (180R) is co-located with the second pickoff sensor (170R).

22. The vibratory flowmeter (5) of claim 13, wherein the first signal comprises a sinusoid.

23. The vibratory flowmeter (5) of claim 13, wherein the filter comprises a plurality of filter coefficients.

\* \* \* \* \*

UNITED STATES PATENT AND TRADEMARK OFFICE
CERTIFICATE OF CORRECTION

PATENT NO. : 10,788,348 B2
APPLICATION NO. : 15/745040
DATED : September 29, 2020
INVENTOR(S) : Matthew Joseph Rensing et al.

It is certified that error appears in the above-identified patent and that said Letters Patent is hereby corrected as shown below:

In the Specification

Column 1, Lines 44 to 48, equation (1) should appear as follows:

$$\begin{bmatrix} C & M \\ M & 0 \end{bmatrix} \begin{Bmatrix} \dot{x} \\ \ddot{x} \end{Bmatrix} + \begin{bmatrix} K & 0 \\ 0 & -M \end{bmatrix} \begin{Bmatrix} x \\ \dot{x} \end{Bmatrix} = \begin{Bmatrix} f \\ 0 \end{Bmatrix}$$

Column 2, Line 42, equation (6) should appear as follows:

$$\phi_i^{(l)T} B = -\phi_i^{(l)T} A \lambda_i$$

Column 2, Line 44, replace "Equation (6) by $\Phi_i^{(r)T}$" with --Equation (6) by $\phi_j^{(r)T}$--.

Column 5, Lines 16 and 20, and Column 13, Lines 42, 60 and 66, replace "a" with --α--.

In the Claims

Column 19, Lines 20 and 26, replace "(a)" with --(α)-- and at Line 24, replace "(k)" with --(λ)--.

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*